July 23, 1963     A. W. GIANNINO     3,098,914
OIL LEVEL WARNING DEVICES
Filed April 27, 1961
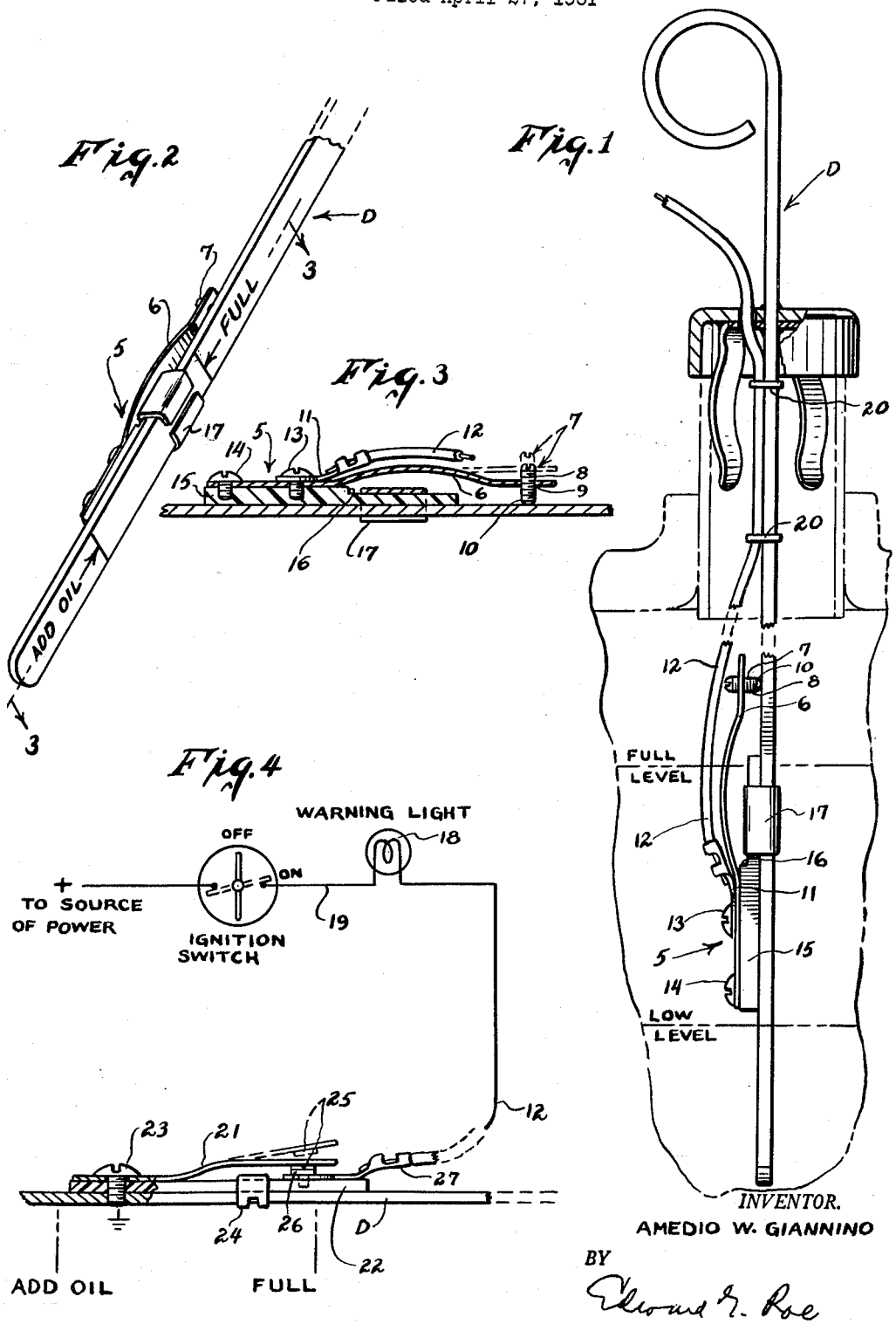
INVENTOR.
AMEDIO W. GIANNINO
BY
Edward G. Roe
ATTORNEY United States Patent Office 3,098,914
Patented July 23, 1963

3,098,914
OIL LEVEL WARNING DEVICES
Amedio W. Giannino, 1618 E. 51st St., Brooklyn, N.Y.
Filed Apr. 27, 1961, Ser. No. 106,068
3 Claims. (Cl. 200—138)

Generically my invention relates to automotive vehicles and specifically it encompasses a device for attachment to the automatic transmission dipstick and connectible with an instrument panel light to warn the driver of the car when the oil level in the automatic transmission is low and requires replenishing. And, I also contemplate that the device may be utilized in connection with crank case dipsticks.

One of the glaring omissions in the dashboard indicia of the modern automobile when it is delivered to the owner is the total lack of any light or other means of notice that the automatic transmission oil is at a dangerous level. The only way of ascertaining the level is to run the car until the transmission oil is hot, lift the hood and check the level with the dipstick. The quick checkup given the motor car by the average gasoline service station includes checking the oil in the engine, filling the tank and wiping the windshield. In very few stations will the attendant check the automatic transmission dipstick on his own volition and then only at the specific direction of the driver. And, too, in many cars the automatic transmission dipstick is difficult of access, particularly with a hot motor. Some stock cars have the dipstick positioned underneath the battery and necessitates reaching under the battery past the manifold and down to the top side of the transmission to lift the dipstick out. It then must be wiped, thrust back and checked. A burned hand can result as the manifold must be traversed.

Exemplifying the indicator lamps provided with some modern cars, the service guides on one of the cars lists the following indicator lamps in the instrument panel for the car:

Direction Signal Indicator Lamp
Oil Pressure Indicator Lamp
Generator Indicator Lamp
Headlight Beam Indicator Lamp
Radio Dial Lamp
Clock Lamp
Heater Control Panel Lamp There is no lamp for indicating lack of oil in the automatic transmission and such a lack in this vital equipment may result in a bill for a major overhaul ranging from about a hundred to several hundred dollars, a blow to the pocketbook and general inconvenience to the car owner in that he is without transportation for about a week, unless he is fortunate enough to have a second car.

The principal object of my invention is the provision of a device which will give the car owner or driver a warning in the instrument panel when the level of the transmission oil is low. Another object is a warning device which is readily attachable to a dipstick of conventional automobile transmissions and connectible with related warning lamp. Still another object is a device which is low in cost and can be purchased and installed at a modest price. Other objects will be manifest.

I have invented an oil level warning device for use with the dipstick of automatic transmissions which will give the owner notice by means of a warning light in the instrument panel that his transmission oil is low without the necessity for lifting the hood and checking the dipstick. It is characterized by economy of manufacture, resulting low cost and can be attached with ease to the dipstick and connected with the wiring system of the conventional automobile equipped with an automatic transmission. Its functioning is positive and by utilizing my invention, the car owner will save himself a major capital outlay often caused by insufficient transmission oil.

Briefly described, my invention comprises a bimetal element affixed at one end to an insulating strip or base in superposed relationship, the free extremity of the bimetal strip provided with a threaded post which, when the element and strip are clamped to a dipstick, is in contact with the dipstick and forms a ground connection. The bimetal strip, where attached to the insulating strip, carries a terminal and wire running to a warning light in the instrument panel and suitably connected to the ignition switch and power source. My invention accomplishes the result that upon the automobile being driven until the transmission oil is at operating temperature, the bimetal strip and the threaded post will be constrained away from the dipstick at the strip's free end, if the oil is at the operating level required. The warning light will thus be extinguished through breaking of the electrical connection, not to be lit again, unless the oil level drops below proper level.

I have marshalled into a device of few parts, a highly useful invention.

In the drawings:

FIG. 1 is a side elevation of the invention.
FIG. 2 is a perspective view, showing my invention.
FIG. 3 represents a cross-section taken on lines 3—3 of FIG. 2.
FIG. 4 is a side elevation of a modified form of the invention and showing a wiring diagram.

With reference to the drawings, D represents a conventional dipstick of an automatic transmission having the usual notations "add oil" at the lower end of the stick and "full" above the aforesaid notation. The dipstick may have a curved hook shaped fingerhold at its upper end, and a filler cap and cap spring to hold the dipstick from becoming dislodged when it is placed in the transmission housing. When with the dipstick seated in the housing, the oil level is between the two markings on the stick, the car can be driven without deleterious effect on the vital parts of the automatic transmission.

For attachment to and use with the dipstick D I provide my device 5, having bimetallic element 6, to the free end of which is threaded or otherwise secured post 7 carrying threads 8. These threads mate with the threads of aperture 9. Oppositely disposed to the threaded portion 8 of post 7 is body portion 10 which with element 6 and relating parts including the confronting face of dipstick D form a ground for a circuit such as is shown in FIG. 4.

The bimetallic arm is rigidly secured to insulating block 15, shouldered as at 16, by means of anchoring screws 13 and 14. Screw 13 also serves to anchor terminal 11 carrying wire 12 to arm 6 as illustrated in FIG. 1. Wire 12 may be secured to the upper portion of dipstick D by clips 20 and the wire is carried thru the filler cap in a suitably provided aperture to warning light 18 in the dash board of the car, said light 18 being connected with the ignition switch as by connection 19. Device 5 is anchored securely to the dipstick by clamp 17 as illustrated in FIGS. 1, 2, and 3; and as depicted in FIGS. 1, 2 and 3 post 7 is shown grounded for the electrical circuit utilized when bimetallic arm 6 is constrained toward dipstick D with the warning light illuminated when the ignition switch is in "on" position.

In practice, when the motor and automatic transmission oil are cold, the car is first started as is well known by turning the ignition switch to "on" position. With bimetallic arm 6 and post 7 grounded, the warning light 18 is illuminated and stays that way until the car has been driven for a few minutes. As soon as the transmission oil becomes heated, the heat of the transmission oil will cause bimetallic arm 6 to be constrained away from dipstick D at its free end (see dot-dash lines in FIG. 3) and cause post 7 to lose contact with dipstick D extinguishing warning light 18, thus indicating to the driver that the oil level is satisfactory for driving. If the level of the oil is low or becomes low, the connection between bimetallic arm 6, post 7 and dipstick D to warning light 18 is not broken and the light 18 stays or goes on, warning the driver that the transmission oil is below a safe level. By replenishing the oil as soon as the driver can reach a service station, a major overhaul of the automatic transmission may be precluded.

Post 7 may be adjusted by turning in or out of arm 6 to compensate for either extremely cold or extremely hot weather.

I have depicted in the lower part of FIG. 4 a modified form of my invention wherein bimetallic element 21 is affixed to insulating block 22 mounted on dipstick D as by screw 23, threaded through the block into the dipstick D. This screw serves both as a ground and securing means, with the forward end of the block 22 secured to to the dipstick by clip 24. The free end of element 22 may have contact 25 brazed thereon for connection with flat headed rivet 26, which anchors wire carrying terminal 27 and wire 12.

The cold or low oil level position of my modification is illustrated in FIG. 4 with the "off" position of bimetallic thermostatic element 21 shown in dot-dash lines. The modification warns the driver that the oil level is low and requires attention if the light 18 stays lit after the car has been driven so that the transmission oil temperature has reached operating temperature and is not of sufficient level so as to cause bimetallic thermostatic element 21 to swing away from contact with rivet 26.

It is to be understood that the above described arrangements and assemblies are illustrative of the principles of the invention. For example, other suitable means than clamps may be utilized in securing the assembly to a dipstick as will be apparent to those skilled in the art, as long as said means permit the shifting or positioning of the assembly to the point on the dipstick where warning will be certain to be given when the oil level is low. Other arrangements or modifications may be devised without departing from the spirit or scope of my invention, and it is not desired to limit the invention to the exact constructions shown and described and I reserve the right to make such changes or modifications as may come within the scope of the appended claims.

I claim:

1. A device for indicating the oil level in an automatic transmission comprising a dipstick, said dipstick including an elongated conductive body adapted to extend generally vertically through an opening in the automatic transmission, a handle secured on the upper end of said body, oil measuring indicia and a switch mounted on a lower end portion of said body, stop means secured to said elongated body between said handle and switch, said stop means adapted to engage said transmission and limit movement of said body into said opening whereby said indicia extends into liquid in said transmission when said liquid is at a safe operating level, an elongated insulated conductor having an end portion extending along and secured to said body between said handle and said switch, said conductor adapted to be connected in series with electric warning means, said switch including a pair of contacts connected in series between said conductor end portion and said body, said switch also including thermostatic means on the lower end portion of said body and said thermostatic means normally maintaining said contacts closed so as to electrically connect said conductor to said elongated body, said thermostatic means when immersed in the transmission liquid being responsive to a rise in temperature of the liquid in said transmission to open said switch and disconnect said warning means from said body so as to cause said warning means to be de-energized and thereby indicate a proper quantity of liquid in said transmission.

2. A device as defined in claim 1 wherein said thermostatic means comprises a bimetallic member having spaced ends, one of said spaced ends secured to said body and the other of said spaced ends secured to one of said contacts.

3. A device as defined in claim 2 wherein said one contact is connected to said other end of said bimetallic member by adjustable thread means.

References Cited in the file of this patent
UNITED STATES PATENTS

| | | |
|---|---|---|
| 1,200,643 | Oswald et al. | Oct. 10, 1916 |
| 1,463,189 | Baker | July 31, 1923 |
| 1,512,817 | Boyden | Oct. 21, 1924 |
| 1,640,257 | Stranszky | Aug. 23, 1927 |
| 1,731,822 | Mau | Oct. 15, 1929 |
| 2,060,296 | Fonseca | Nov. 10, 1936 |